Patented Dec. 25, 1945

2,391,849

UNITED STATES PATENT OFFICE 2,391,849

REACTION PRODUCTS OF 1,4-DICHLORO-2-BUTENE

Robert F. Taylor, Terre Haute, Ind.

No Drawing. Application March 25, 1944,
Serial No. 528,174

4 Claims. (Cl. 260—475)

My invention relates to new compositions of matter, and more particularly, it relates to 2-butene-1,4-diol dialkyl diphthalates having the following general structural formula:

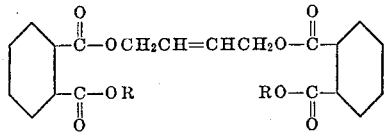

wherein the substituent R represents an alkyl group.

Compounds of the above type may be synthesized by reacting 1,4-dichloro-2-butene or a suitable halogen analog thereof with an alkali metal alkyl phthalate. The alkali metal alkyl phthalate compound may be readily prepared in either one of the two following ways: by reacting the desired alkali metal alkoxide with phthalic anhydride in a known manner, or by reacting the desired aliphatic alcohol with phthalic anhydride, preferably in a ratio of about two moles of alcohol for each mole of phthalic anhydride to yield the corresponding hydrogen alkyl phthalate which may then be converted to the alkali metal alkyl phthalate by reaction with the desired alkali metal hydroxide. In instances where the hydrogen alkyl phthalate is readily purified and the alkali metal alkyl phthalate is easily freed from water, either type of the aforesaid phthalic acid derivatives may be employed. However, when the hydrogen alkyl phthalate cannot be readily purified, or when the alkali metal alkyl phthalate derived from the aforesaid hydrogen alkyl phthalate cannot be readily dried, it is preferable to prepare such alkali metal alkyl phthalates through the alkali metal alkoxide, as indicated above. After the alkali metal alkyl phthalate has been prepared, 1,4-dichloro-2-butene is added to a solution consisting of the alkali metal alkyl phthalate dissolved in a suitable solvent, such as an alcohol corresponding to that employed in esterifying the phthalic anhydride, in a ratio of approximately one mole of 1,4-dichloro-2-butene to two moles of phthalic acid derivative. This mixture is then heated under reflux until precipitation of the alkali metal halide appears to be complete. The resulting mixture is then filtered and the filtrate concentrated by heating the same under reduced pressure. After the solvent has thus been removed, the residue obtained consists of substantially pure 2-butene-1,4-diol dialkyl diphthalate. If the product is normally a solid, it can be recrystallized from a suitable solvent, such as one of the lower aliphatic alcohols; for example, ethanol.

As examples of esters included by the above generic formula and which are considered as lying within the scope of my invention, there may be mentioned 2-butene-1,4-diol diethyl diphthalate, 2-butene-1,4-diol dimethyl diphthalate, 2-butene-1,4-diol diisopropyl diphthalate, 2-butene-1,4-diol di-2-ethylhexyl diphthalate, 2-butene-1,4-diol dibutyl diphthalate, and the like.

My invention may be further illustrated by the following specific examples.

EXAMPLE I

To a refluxing solution consisting of 57.5 g. of metallic sodium and 1 liter of absolute methanol was slowly added 370 g. of phthalic anhydride. Immediately upon the addition of phthalic anhydride, a vigorous reaction occurred and a flocculent precipitate formed. Thereafter an additional 300 ml. of methanol was added and the suspension was refluxed for a period of approximately thirty minutes. A total of 144 g. of 1,4-dichloro-2-butene was next added and the resultant mixture was then refluxed for twenty-four hours on a steam bath. The precipitate thus formed which consisted of sodium chloride was then filtered off and the filtrate concentrated in vacuo. After part of the methanol had been removed and the temperature decreased to 10° C., a precipitate formed. This solid was filtered off, washed thoroughly with water, and dried. It amounted to 141.6 g. and was found to be substantially pure 2-butene-1,4-diol dimethyl diphthalate. Further evaporation of the filtrate gave 180.3 g. of crude ester. The total yield of crude material was 321.9 g., representing 67.9 per cent of theory. This material was sufficiently pure for the majority of technical uses and could be further purified by recrystallization from methanol.

EXAMPLE II

A mixture consisting of 444 g. of phthalic anhydride and an equal amount of butanol was heated for 10 minutes. After all of the phthalic anhydride had dissolved, the solution was then chilled and the precipitated solid filtered off and neutralized with a solution of 81.5 g. of sodium hydroxide dissolved in the minimum amount of water. The solution was cooled during neutralization to prevent hydrolysis of the ester. Thereafter, 700 ml. of butanol was added and the water removed as an azeotrope with butanol until the temperature of the reaction vessel reached 100° C. at which point a solid product began to separate. One hundred and nineteen grams of 1,4-dichloro-2-butene was then added and the mixture stirred and refluxed under a water separater for eighteen hours to remove all of the water. The oil layer was then returned from the separator to the reaction vessel and the mixture refluxed for an additional six hours. The salt formed during the reaction was filtered off and the filtrate distilled at atmospheric pressure to remove the butanol. The residue was heated to 250° C. at 5 mm. pressure to remove dibutyl phthalate, phthalic acid and other impurities. The 2-butene-1,4-diol dibutyl diphthalate thus obtained was then decolorized with 2 per cent Norite (decolorizing carbon) by heating at 100° for a period of one hour. The material thus obtained was still dark in color and amounted to 287.4 g. corresponding to a yield of 60.9 per cent of theoretical.

The table appearing below lists various physical properties of certain esters of my invention which were prepared in accordance with the general method outlined in the foregoing examples.

obtained from single preparations of the various esters listed.

The new esters of my invention have been found useful as plasticizers for numerous film-forming compositions as well as various types of synthetic rubber, such as for example, those prepared by the polymerization of vinyl chloride and certain copolymers thereof. The new esters of my invention are also useful in the synthesis of new and valuable organic compounds. Other uses of these materials will be apparent to those skilled in the art.

My invention now having been described, what I claim is:

1. 2-butene-1,4-diol dialkyl diphthalates having the following structural formula:

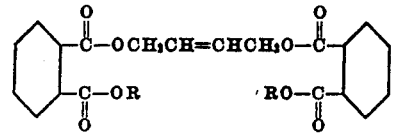

wherein the substituent R represents an alkyl group.

Table

| Compound | Physical state | Saponification equivalent | | Percent carbon | | Percent hydrogen | |
|---|---|---|---|---|---|---|---|
| | | Found | Theory | Found | Theory | Found | Theory |
| 2-butene-1,4-diol dimethyl diphthalate | White solid M. P. 82° C | 103.5 | 103.8 | 64.16 | 64.05 | 4.97 | 4.89 |
| 2-butene-1,4-diol diethyl diphthalate | White solid M. P. 67° C | 109.8 | 110.0 | 65.35 | 65.17 | 5.73 | 5.47 |
| 2-butene-1,4-diol diisopropyl diphthalate | Oil-decomposition began at 165° C. (5 mm.) | 118.4 | 117.0 | 66.07 | 66.67 | 6.12 | 5.98 |
| 2-butene-1,4-diol dibutyl diphthalate | Oil-stable to 250° C. (5 mm.) | 128.6 | 124.0 | 68.14 | 67.75 | 6.74 | 6.45 |
| 2-butene-1,4-diol di-2-ethyl hexyl diphthalate | do | 155.2 | 152.0 | 70.38 | 71.05 | 8.04 | 7.89 |

Although the above physical properties may be helpful in identifying these compounds, it is to be understod that I do not desire to limit myself to products having the exact physical characteristics described above since the data were 2. 2-butene-1,4-diol dimethyl diphthalate.
3. 2-butene-1,4-diol diethyl diphthalate.
4. 2-butene-1,4-diol dibutyl diphthalate.

ROBERT F. TAYLOR.